United States Patent [19]
Hildebrand

[11] Patent Number: 5,042,566
[45] Date of Patent: Aug. 27, 1991

[54] HEATING OR AIR CONDITIONING SYSTEM FOR A MOTOR VEHICLE

[75] Inventor: Reinhard Hildebrand, Redwitz, Fed. Rep. of Germany

[73] Assignee: Siemens Aktiengesellschaft, Berlin and Munich, Fed. Rep. of Germany

[21] Appl. No.: 525,531

[22] Filed: May 18, 1990

[30] Foreign Application Priority Data

May 19, 1989 [EP] European Pat. Off. ........ 89109072.2
May 19, 1989 [DE] Fed. Rep. of Germany ... 8906222[U]
Dec. 20, 1989 [DE] Fed. Rep. of Germany ... 8914901[U]

[51] Int. Cl.$^5$ ............................................. B60H 1/00
[52] U.S. Cl. ...................................... 165/42; 165/43; 165/22; 237/12.3 A; 237/12.3 B; 98/2.08; 98/2.11; 236/13
[58] Field of Search ............................ 165/22, , 42, 43; 237/12.3 A, 12.3 B; 98/2.08, 2.11; 236/13

[56] References Cited

U.S. PATENT DOCUMENTS 4,665,971 5/1987 Sakurai ................................ 165/43
4,899,809 2/1990 Takenaka et al. .................... 165/22

FOREIGN PATENT DOCUMENTS 0123520 9/1980 Japan ..................................... 165/43
0252016 12/1985 Japan ..................................... 165/43

Primary Examiner—John K. Ford
Attorney, Agent, or Firm—Kenyon & Kenyon

[57] ABSTRACT

Improved air-conditioning of the rear-seat area of a motor vehicle is achieved substantially independently from the front-seat area in a heating or air-conditioning system having means for controlling the temperature of the supply air via a front-seat control unit by employing a front air flap with a cool air passage at the inlet of a heat exchanger. A front-seat air-mix chamber is connected with a rear-seat air-mix chamber having a rear-seat area duct, a rear-seat foot duct, and a rear-seat air-mix flap with a cool air passage therethrough to control the proportion of cool and warm air entering the ducts. Cool air is provided from the inlet side of a heat exchanger flowing through the cool air passage in the front air flap and the cool air passage in the rear-seat air-mix flap while warm air is provided from the outlet of the heat exchanger. The rear-seat air-mix flap is actuated either jointly with a front-seat air-mix flap in a front-seat air-mix chamber by a temperature-setting element on the front-seat control unit or by a separate rear-seat control unit.

18 Claims, 2 Drawing Sheets

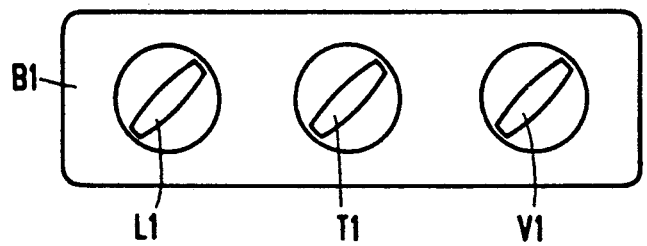
FIG 1
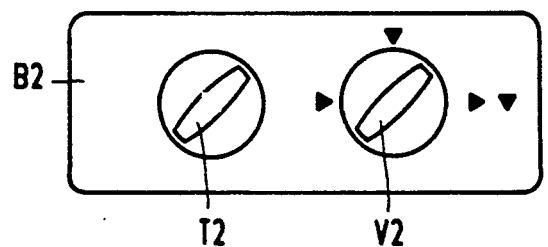
FIG 2
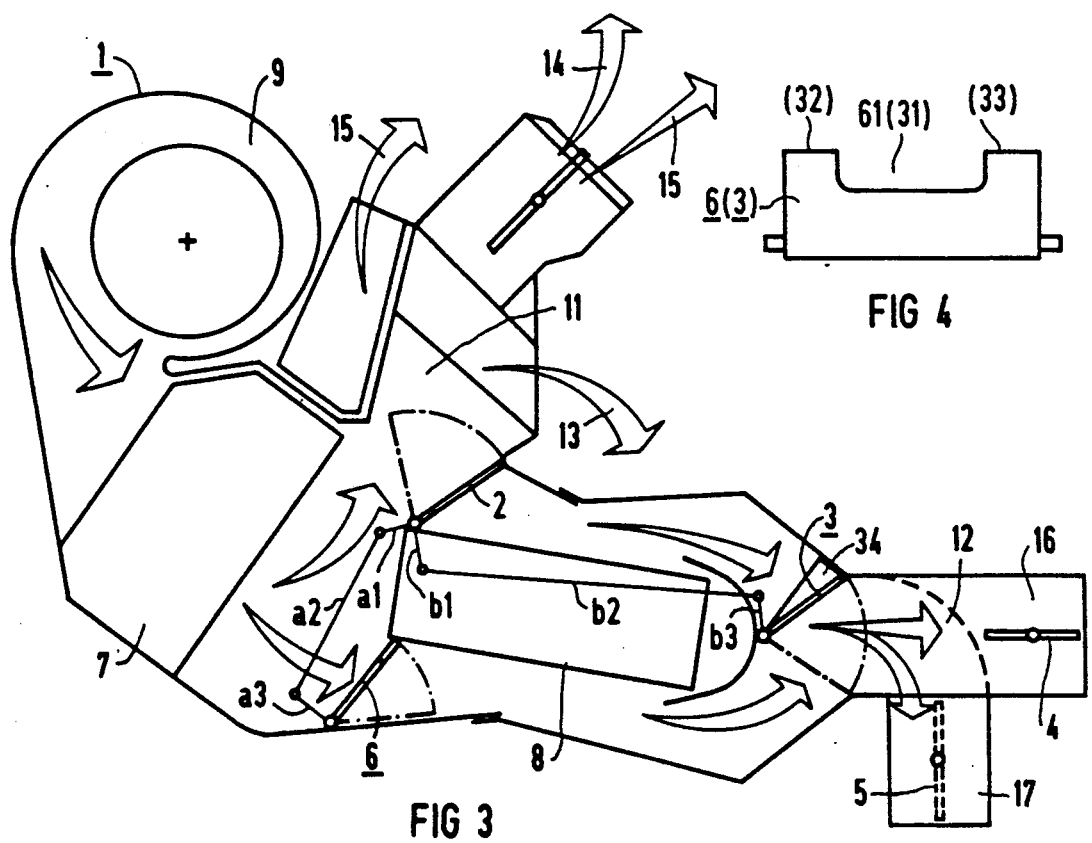
FIG 3
FIG 4

HEATING OR AIR CONDITIONING SYSTEM FOR A MOTOR VEHICLE

BACKGROUND OF THE INVENTION

This invention relates to climate control in motor vehicles in general and more particularly to a control mechanism for use in a heating or air conditioning system with a rear seat air supply system, the mechanism independently controlling the air distribution in the rear seat area.

A conventional heating or air conditioning system with a rear seat air supply system is disclosed in U.S. Pat. No. 4,586,652. In that system, air is conveyed from a blower unit through an evaporator and thence is conducted, in accordance with the position of an air flap, directly to the passenger compartment as cool air or, by passing it through a heat exchanger, as warm air. The mixture ratio of warm air to cool air can be adjusted by an air-temperature setting element on a front-seat control unit in the front-seat area of the passenger compartment.

The system includes a front-seat air-mix chamber in the front-seat area of the passenger compartment. The front-seat outlet area of the front-seat air-mix chamber is trifurcated in the conventional manner into a defroster air duct, a front seat foot air duct and a median-plane air duct (which leads to one or several vents, preferably in the dashboard).

Three other ducts are connected to the front-seat air mix chamber. The first connects the front-seat air-mix chamber with the outlet side of the evaporator, the second connects the chamber with the inlet side of the heat exchanger, and the third with the outlet side of the heat exchanger. The inlet to the heat exchanger inlet duct is provided with a front air flap to control the flow of cool air into the inlet side of the head exchanger and the inlet to the heat exchanger outlet duct is provided with a front-seat air-mix flap to control the proportion of warm and cool air entering the front-seat air-mix chamber.

The latter two ducts also connect the heat exchanger inlet and outlet with a rear-seat air-mix chamber. These ducts terminate in a common mouth at the entrance to the rear-seat air-mix chamber. By means of a rear-seat air-mix flap on the common mouth of these two ducts, the cool air flow to the rear-seat area from the inlet side of the heat exchanger can be completely blocked, independently of a rear-seat control, or can be admixed in part with the warmed air from the outlet side of the heat exchanger.

SUMMARY OF THE INVENTION

The present invention provides means to control in a simple manner the climate in the entire interior space of a motor vehicle, providing the ability to independently control the climate in the front-seat area and the rear-sear area.

While the known system described above is operable to control ventilation, heating, or air-conditioning of the passenger compartment only from the front-seat area, the design according to the present invention also enables, by means of a few supplementary components, a substantially individual rear-seat area air-conditioning that is independent from the front-seat area.

In the present invention, the rear-seat air-mix chamber and the rear-seat air-mix flap provided in this air-mix chamber make it possible for the cool or warm air flows from the input or output side of the heat exchanger to be mixed under control from the rear-seat area as well. In particular, cool air can be supplied by means of a cool air passage in the front air flap (at the entrance of the duct leading to the inlet side of the heat exchanger) for each position of the front air flap. This cool air can be fresh air from outside the automobile or, when the system is equipped with a so-called return-air flap, a portion of air recirculated from the passenger compartment can replace some of the fresh air.

According to a refinement of the present invention, the front-seat air-mix flap, the rear-seat air-mix flap and the front air flap are regulated by a rear-seat temperature setting element independently of the front-seat temperature setting element. This can be accomplished by means of a coupling linkage between the respective flaps, which can be in the form of a common connecting link guide or an electric shaft between the flaps that can be driven by a single motor.

BRIEF DESCRIPTION OF THE DRAWINGS

FIG. 1 is a top view of a front-seat control unit.

FIG. 2 is a top view of a rear-seat control unit.

FIG. 3 is a cross-sectional view of a heating or air-conditioning system according to the present invention.

FIG. 4 is a top view of the front air flap or the rear-seat air-mix flap, each having a recessed opening for fresh air.

DETAILED DESCRIPTION

Figure 5:
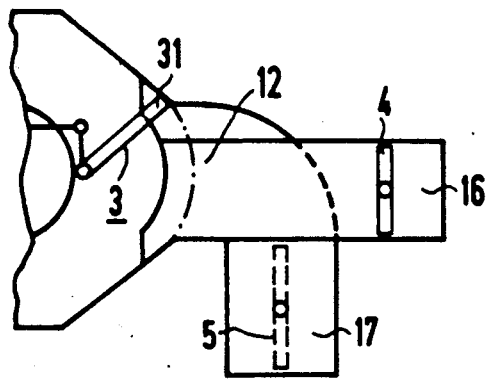
FIG. 5 is a cross-sectional view of the rear-seat air-mix chamber with the rear-seat air-mix flap shown in its upper, closed position.

The heating or air-conditioning system illustrated in cross-section in FIG. 3 is enclosed in a plastic housing 1. Fresh or recirculated air is supplied from a blower unit 9 located on the input side of an evaporator 7. When, as illustrated in FIG. 1, front air flap 6 is disposed in its fully closed position blocking the inlet side of heat exchanger 8 and front-seat air-mix flap 2 is disposed in its fully opened position, the cool air current flowing out of the evaporator 7 reaches the front-seat air-mix chamber 11. From there, in accordance with the adjusted air distribution, is directed into a front foot-area air duct 13, a front-defroster air duct 14, or front median-plane air ducts 15 (one of which leads to a center duct and another to side ducts in the dashboard).

As shown in FIG. 1, control unit B1 includes an air-temperature setting element T1, an air-distributor setting element V1, and an air-quantity setting element L1. Air-temperature setting element T1 serves to adjust the temperature. Air-distributor setting element V1 controls air distribution by opening or closing shutting flaps in the individual air ducts. Air-quantity setting element L1 controls the various speed steps of the blower unit 9 to control the volume of the air flow.

The air-temperature setting element T1 controls the air temperature by regulating the positions of the front air flap 6 and the front-seat air-mix flap 2, and by controlling the volume and temperature of the water flow through the heat exchanger 8. Regardless of the setting of the air-temperature setting element T1 (and therefore of the positions of flaps 2 and 6 and of the volume and temperature of the water in the heat exchanger 8) cool air can reach the rear-seat air-mix chamber 12 through an opening 61 in the air flap 6, illustrated in FIG. 4.

Depending on the setting on the air-temperature setting element T1, some of the air entering the front-seat air-mix chamber should be warmed. In that case, some of the cool air emerging from the evaporator is conducted in a through heat exchanger 8. The relative setting of the position of the front-seat air-mix flap 2 and the front air flap 6 determines the portion of air from the evaporator 7 that enters into the heat exchanger 8; a specific mixture ratio of cool air and warm air is achieved according to the setting on the air-temperature setting element T1. The front-seat air-mix flap 2 and the air flap 6 are coupled to each other by means of a coupling linkage a1; a2; a3.

Plastic housing 1 is provided with an enlargement directed towards the rear-seat area. This enlargement contains a rear-seat air-mix chamber 12 with a rear-seat air-mix flap 3. The rear-seat air-mix chamber 12 is connected on its inlet side to both the inlet side and the outlet side of the heat exchanger 8. By changing the position of the rear-seat air-mix flap 3, the relative proportion portion of the cool air flowing in from the inlet side of the heat exchanger and the warm air flowing in from the outlet side of the heat exchanger 8 can be controlled. Regardless of the front-seat control of the air flow through the heat exchanger 8, particularly when the front air flap 6 is completely closed (and, due to the coupling of the front-seat air-mix flap 2 to the front air flap 6, the outlet side of the heat exchanger 8 is completely closed by front-seat air-mix flap 2), a fresh air passage to the rear-seat air-mix chamber 12 is provided by the opening 61 in front air flap 6.

The rear-seat air-mix chamber 12 discharges into a rear-seat area duct 16 and one or more rear-seat foot air ducts 17. The rear-seat area duct is provided with a rear-set area closing flap 4 and the rear-set foot duct 17 is provided with a rear-seat foot closing flap 5. In the embodiment illustrated in FIG. 3, the rear-seat air-mix flap 3 coupled to the front-seat air-mix flap and the shutting flap 6 by a coupling linkage b1; b2; b3. In the depicted end setting of the flaps, that is, when the front-seat air-mix flap 2 is fully opened, thereby blocking the output side of the heat exchanger 8 and allowing the maximum flow of cool air into the front-seat air-mix chamber, and the rear-seat air-mix flap 3 is fully closed, cool air reaches the rear-seat air-mix chamber via the opening 61 in the front air flap. Cool air also reaches the rear-seat air-mix chamber when the flaps are in any intermediate positions, up to the opposite end position.

The rear-seat air-mix flap 3 can be coupled to the front-seat air-mix flap so that both are adjusted by the front-seat temperature setting element T1 on the front-seat control unit B1. The shutting flaps 4 or 5 in the air ducts 16 or 17 are also adjusted by the front seat air-distributor setting element V1.

To further improve passenger comfort, an additional rear-seat control unit B2 with an air-temperature setting element T2 and an air-distributor setting element V2 is provided. These controls adjust the rear-seat air-mix flap 3 and the shutting flaps 4 and 5 in coordination. The rear-seat air-mix flap 3 is controlled by the air-temperature setting element T2 while the shutting flaps 4 and 5 are controlled by the air-distributor setting element V2. As with the front air flap 6, cool air can always reach the rear-seat area through opening 61 on the edge of rear-seat air-mix flap 6.

Another way to enhance passenger comfort is to provide proportionately more warm air to the rear-seat foot area than to the rear-seat area. A rear-seat temperature distribution having higher temperatures in the foot area and lower temperatures in the center plane or toward the head area is considered to be more comfortable than a uniform distribution, particularly for heating in the winter. In the present invention, this temperature distribution can be achieved with rear-seat air distributing means. Through these means, particularly when the rear-seat air-mix flap begins to open out of its closed position to provide air flow from the outlet side of the heat exchanger, a greater portion of warm air can be supplied to the air duct leading to the rear-seat foot area than can be supplied to the air duct leading to the rear-seat area.

One structure for the air distribution means, illustrated in FIG. 3, is at least one air guide blade 34 formed on the rear-seat air-mix flap 3. This air guide blade 34 provides a more concentrated flow of air to the inlet of the rear-seat foot duct 17 from the outlet side of the heat exchanger 8 while isolating the rear-seat area duct from the outlet side of the heat exchanger.

An alternate structure for the air distribution means, shown in FIGS. 4–9, which provides a supply of cool air to the rear-seat area duct 16, is a passage 31 formed in the rear-seat air-mix flap 3. Passage 31 is similar to the opening 61 in the front air flap 6. When rear-seat air-mix flap 3 moves out of its fully closed position blocking the outlet side of the heat exchanger 8, warm air from the outlet side of the heat exchanger can only enter rear-seat foot duct 17, while the opening to the rear-seat area duct 16 is still blocked by the rear-seat air-mix flap 3.

Passage 31 is bounded on the upper edge of rear-seat air-mix flap 3 by edge areas 32 and 33, which lie laterally higher and which are allocated to the rear-seat foot ducts 17, which are accordingly placed higher than the rear-seat foot duct 16. The way in which cool air from air passage porthole 31 enters the rear-seat air-mix chamber is described in detail below based on FIGS. 5–9. Structurally-simple openings 31 or 61 in air flaps 3 or 6 can be replaced by a fresh-air bypass to the rear-seat air-mix chamber 12.

The rear-seat area duct 16 and the two separated rear-seat foot ducts 17 arranged laterally about duct 16 communicate with the right end of the housing surrounding the heat exchanger 8. The inlet of rear-seat area duct 16 is placed lower than the inlets of the rear-seat foot ducts 17. As indicated in FIG. 4 and shown in perspective in FIG. 9, the rear-seat air-mix flap 3 has a central cool air passage 31 on its upper edge. The body of the rear-seat air mix flap provides for the closure or opening of the inlet of rear-seat area duct 16 while the edge areas 32 and 33 of the air-mix flap operate to close or open the inlets of the rear-seat foot ducts 17. When the rear-seat air-mix flap 3 is in its upper, closed position as shown in FIG. 5, warm air from the outlet side of heat exchanger 8 can enter neither rear-seat area duct 16 nor rear-seat foot ducts 17. Instead, these ducts can be fully charged with cool air via the opening 61 in the front air flap 6 via the inlet side of the heat exchanger 8.

Figure 6:
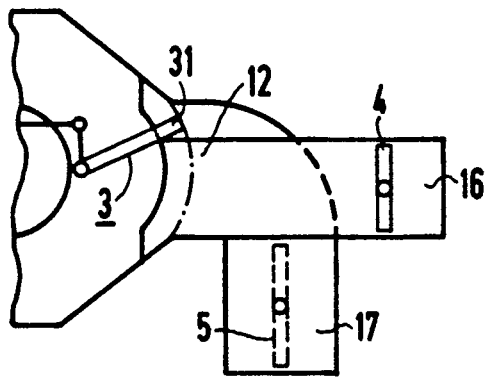
FIG. 6 is a cross-sectional view of the rear-seat air-mix chamber with the rear-seat air-mix flap shown in a partially open position.

When the rear-seat air-mix flap 3 is in the position shown in FIG. 6, warm air from the outlet side of the heat exchanger 8 is blocked from entering the rear-seat area duct 16, but can enter rear-seat foot ducts 17.

Figure 7:
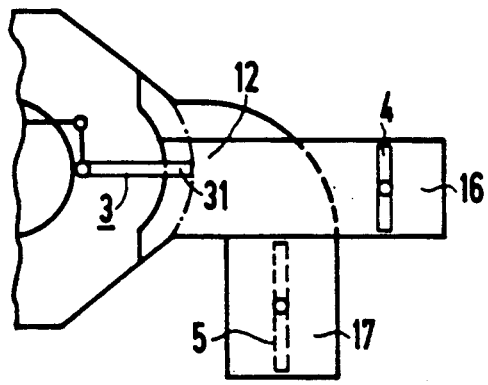
FIG. 7 is a cross-sectional view of the rear-seat air-mix chamber with the rear-seat air-mix flap shown in a further opened position.

When rear-seat air-mix flap 3 is in the position shown in FIG. 7, warm air from the outlet side of the heat exchanger 8 can enter both the rear-seat area duct 16 and the rear-seat foot ducts 17, although a larger portion enters the latter ducts.

Figure 8:
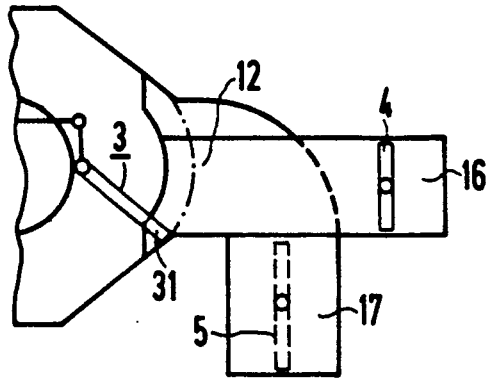
FIG. 8 is a cross-sectional view of the rear-seat air-mix chamber with the rear-seat air-mix flap shown in its lower, fully-opened position.

When the rear-seat air-mix flap 3 is in the position shown in FIG. 8, cool air from the inlet side of the heat exchanger can only reach the rear-seat area duct 16, since the edge areas 32 and 33 of the rear-seat air-mix flap block the inlets to the rear-seat foot ducts 17. This is aided by side wall area 161 that is displaced downwards in the dividing walls of the rear-seat area duct 16 toward rear-seat foot ducts 17 on both sides. The inlet to rear-seat area duct 16, however, is still open to cool air from the inlet side of the heat exchanger via cool air passage 31.

The present invention therefore employs a cool air passage 31 formed in the rear-seat air-mix flap 3, which is mated to rear-seat area duct 16, and surrounding edge areas 32 and 33, which are mated to the rear-seat foot ducts 17. When the rear-seat air-mix flap 3 moves out of its first closed position blocking the outlet side of the heat exchanger 8 it does not immediately permit passage of warm air into the rear-seat area duct, and the cool air passage 31 allows cool air from the inlet side of the heat exchanger to flow into the rear-seat area air duct 16 regardless of the position of the rear-seat air-mix flap 3.

The rear-seat air-mix chamber 12, being the spatial area in which the warm air from the outlet side of the heat exchanger and the cool air from the inlet side of the heat exchanger mix in different proportions according to the position of the rear-seat air-mix flap 3, is thereby divided into three air-mix sub-chambers for the three ducts 16 and 17.

As shown in FIGS. 5-8, the following possible air distributions are possible. In the position of the rear-seat air-mix flap 3 shown in FIG. 5, both the rear-seat area duct 16 and the two rear-seat foot ducts 17 are supplied with only cool air. In the position of the rear-seat air-mix flap 3 shown in FIGS. 6 and 9, the rear-seat area duct 16 still receives only cool air, while the rear-seat foot ducts 17 receive about 90% cool air and 10% warm air. In the position of the rear-seat air-mix flap 3 shown in FIG. 7, the rear-seat area duct 16 receives about 10% warm air and 90% cool air, while the rear-seat foot ducts 17 receive about 60% cool air and 40% warm air. Finally, in the position of the rear-seat air-mix flap 3 shown in FIG. 8, that is, in the maximum warm-air position, the rear-seat foot ducts 17 receive nearly all warm air, while a significant proportion of cool air portion is delivered to the rear-seat area duct 16 through the cool air passage 31.

Figure 9:
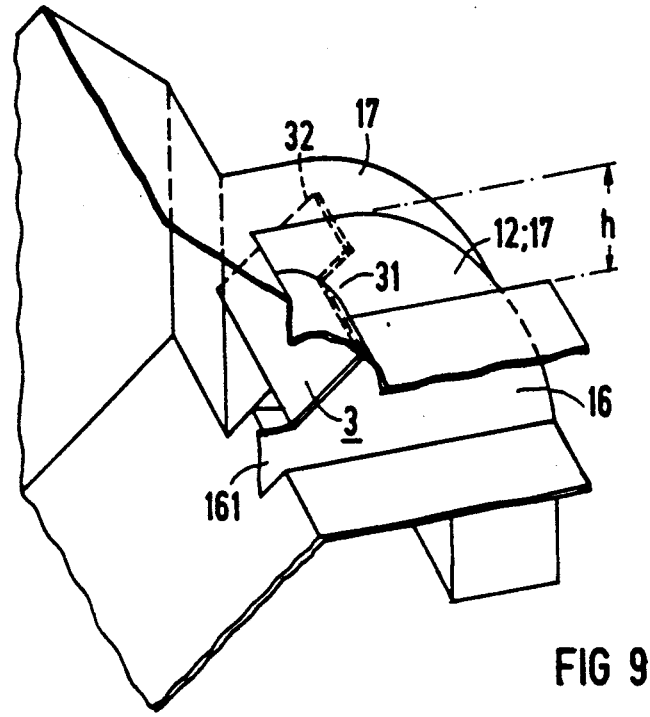
FIG. 9 is a cross-sectional, perspective view of the rear-seat air-mix chamber.

In addition to the passenger comfort advantages described above, the configuration of the air ducts 16 and 17, as shown in FIG. 9, also permits a space-saving configuration in the motor vehicle. The rear-seat area duct 16 can be placed above the motor vehicle's drive shaft tunnel and the rear-seat foot ducts 17 can be placed on both sides of the tunnel.

What is claimed is:

1. A climate control system for a motor vehicle having a front seat area and a back seat area comprising:
   a. a heat exchanger having an air inlet and an air outlet;
   b. a source of cool air;
   c. a first passage coupling cool air from said source to said heat exchanger inlet;
   d. a second passage from said heat exchanger outlet to the front seat area to conduct warm air;
   e. a front air flap in said first passage movable between a position where a minimum amount of air from said first passage is directed through said heat exchanger to a position where a maximum amount of air from said first passage is passed through said heat exchanger;
   f. means for setting said front air flap from the front seat;
   g. a rear-seat air-mix chamber having an air inlet and an air outlet;
   h. a third passage from said air inlet of said heat exchanger to said rear-seat air-mix chamber directing cool air thereto;
   i. a fourth passage from said outlet of said heat exchanger to said rear-seat air-mix chamber directing warm air thereto;
   j. a rear-seat air-mix flap for selecting air from said third and fourth passages to be provided to said outlet of said rear-seat air-mix chamber; and
   k. a fifth passage bridging said front air flap, said fifth passage comprising a cut-out in one edge of said front air flap, such that a portion of cool air is always directed to said third passage, even when said front air flap is in said minimum position.

2. The invention of claim 1 wherein said rear-seat air-mix flap is movable between a position where a minimum amount of air from said fourth passage is directed to said inlet of said rear-seat air-mix chamber and a position where a maximum amount of air from said fourth passage is directed to said inlet of said rear-seat air-mix chamber and further comprising:
   a. a front-seat air-mix chamber having an outlet and being coupled to said source of cool air and said first passage and said second passage; and
   b. a front-seat air-mix flap movable between a position where a minimum amount of air from said second passage is directed to said inlet of said front-seat air-mix chamber and a position where a maximum amount of air from said second passage is directed to said inlet of said front-seat air-mix chamber and operatively linked to said front air flap and said rear-seat air-mix flap such that movement of any of said flaps from its minimum position to its maximum position produces a corresponding movement of the others of said flaps between their respective minimum and maximum positions.

3. The invention of claim 2 further comprising a front-seat temperature setting element operatively connected to and controlling the positions of said front-seat air-mix flap, said rear-seat air-mix flap, and said front air flap.

4. The invention of claim 3 further comprising a rear-seat area duct and a rear-seat foot duct, each of said ducts being coupled at an inlet end to said rear-seat air-mix chamber.

5. The invention of claim 4 further comprising a rear-seat temperature setting element operatively connected to, and controlling the operation of, said rear-seat air-mix flap.

6. The invention of claim 4 further comprising means for distributing air in said rear-seat air-mix chamber, said air distributing means directing to said rear-seat foot duct more warm air from said fourth passage than cool air from said third passage and directing to said rear-seat area duct more cool air from said third passage than warm air from said fourth passage.

7. The invention of claim 6 wherein said air distributing means comprises an air guide blade attached to said rear-seat air-mix flap.

8. The invention of claim 6 wherein said air distributing means comprises a rear-flap fresh-air passage formed in said rear-seat air-mix flap, said rear-flap fresh-air passage communicating with said third passage and said rear-seat area duct between said minimum position and said maximum position of said rear-seat air-mix flap.

9. The invention of claim 4 further comprising a first closing flap operatively disposed within said rear-seat area duct and a second closing flap operatively disposed within said rear-seat foot duct, each of said closing flaps operating to selectively close their respective duct.

10. The invention of claim 9 further comprising a front-seat air-distributor setting element being operatively connected to each of said closing flaps to operate said closing flaps in coordination to regulate opening and closing of said ducts.

11. The invention of claim 10 further comprising a rear-seat temperature setting element operatively connected to, and controlling the operation of, said rear-seat air-mix flap.

12. The invention of claim 11 further comprising a rear-seat air-distributor setting element being operatively connected to each of said closing flaps to operate said closing flaps in coordination to regulate opening and closing of said ducts.

13. The invention of claim 12 further comprising:
a. a front-seat control unit operatively supporting said front-seat temperature-setting element and said front-seat air-distributor setting element;
b. a rear-seat control unit operatively supporting said rear-seat temperature-setting element and said rear-seat air-distributor setting element.

14. The invention of claim 12 further comprising means for distributing air in said rear-seat air-mix chamber, said air distributing means directing to said rear-seat foot duct more warm air from said fourth passage than cool air from said third passage and directing to said rear-seat area duct more cool air from said third passage than warm air from said fourth passage.

15. The invention of claim 14 wherein said air distributing means comprises an air guide blade attached to said rear-seat air-mix flap.

16. The invention of claim 14 wherein said air distributing means comprises a rear-flap fresh-air passage formed in said rear-seat air-mix flap, said rear-flap fresh-air passage communicating with said third passage and said rear-seat area duct between said minimum position and said maximum position of said rear-seat air-mix flap.

17. The invention of claim 13 further comprising a second rear-seat foot duct and wherein said rear-seat foot ducts are disposed about, and a least partially below, said rear-seat area duct and said ducts define a therebetween a space below said rear seat area duct, whereby an automobile drive shaft tunnel can be disposed through said space.

18. The invention of claim 17 wherein
a. said inlet ends of said rear-seat foot ducts are disposed above said rear-seat area duct;
b. said rear-seat air-mix flap has an upper edge having two edge areas;
c. said air-distributing means comprises a cut-out formed in said rear-seat air-mix flap between said two edge areas; and
d. one of said edge areas is operatively disposed for motion within said inlet end of one of said rear-seat foot ducts and the other of said edge areas is operatively disposed for motion within said inlet end of the other of said rear-seat foot ducts.

* * * * *